Feb. 20, 1934.  H. C. FORD  1,948,105
ANTIFRICTION BEARING
Filed May 4, 1928

INVENTOR
Hannibal C. Ford
BY Moakley & Gill
ATTORNEY

Patented Feb. 20, 1934

1,948,105

UNITED STATES PATENT OFFICE 1,948,105

ANTIFRICTION BEARING

Hannibal C. Ford, Jamaica, N. Y., assignor to Ford Instrument Company, Inc., Long Island City, N. Y., a corporation of New York Application May 4, 1928. Serial No. 275,196

7 Claims. (Cl. 308—189)

The present invention relates to anti-friction bearings and in particular to ball bearings. The invention contemplates a device of this nature which is of simple and rugged construction, easily assembled, and as readily taken apart, when, for example, it is desirable or necessary to replace a defective ball, or balls. An attractive feature of the ball bearing of this invention is its freedom from assembly-preserving means of a nature which is apt to cause injury or deformation of elements of the bearing, when the latter is taken apart for any reason.

It is a purpose to form a bearing of the character indicated, which shall be capable of serving both as a radial and a thrust bearing, and one of its favorable peculiarities is such a formation and correlation of its parts that, when stress seeks to dissociate them, a strengthening of the cooperative relationship of such parts is effected. Thus, there is produced a reliability of mutual association of parts, a smoothness of operation and an ability to properly care for radial and end thrust stresses by a relatively few, and simple co-acting parts, easily replaceable, in case of need, without special tools or appliances.

Other features and advantages will become apparent hereinafter, and will, of course, be understood to be features of the present invention.

Figure 1:
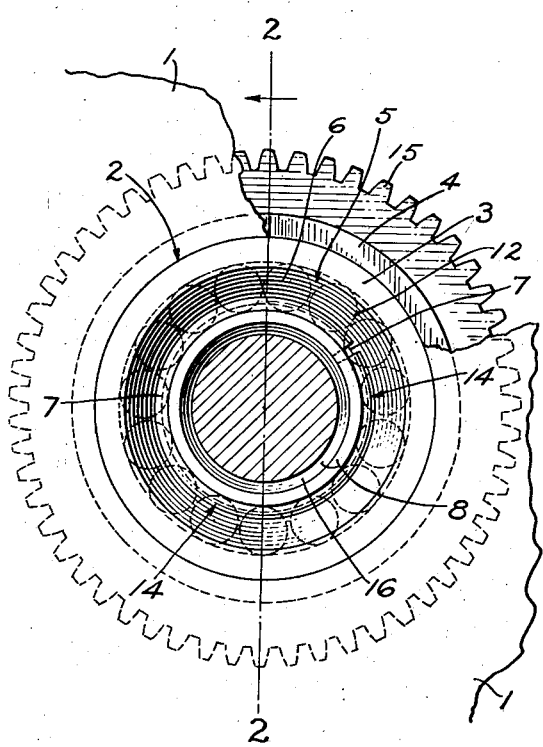
Figure 2:
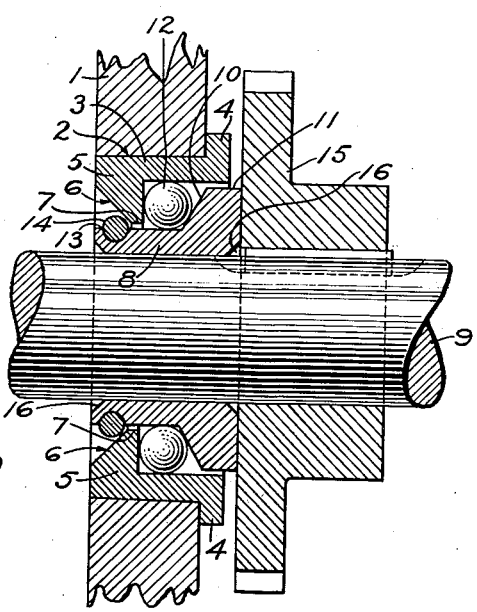

A preferred form of the invention is illustrated in the accompanying drawing, in which Fig. 1 is an end view of an assembly in which the improved ball bearing is employed; and Fig. 2 is a section taken on the line 2—2, of Fig. 1.

Referring to the drawing, 1 represents any support, such as a standard or plate in which a circular hole 2 is present for the reception of a bearing. In the illustrated embodiment of the invention an outer ball race 3 is forced into the hole 2, and is provided with an outwardly directed annular flange 4 at one end, which is adapted to be pushed against one face of the support 1, whereby the outer ball race 3 is given a definite position. At its opposite end, the outer ball race 3 is provided with an inwardly directed annular flange 5, which is beveled, as at 6, attenuating the flange 5 as it extends inward until it forms a circular central opening 7. The thickness of the outer ball race 3 in the substantially cylindrical body portion that is between the flanges 4 and 5 is such that a ball cup is formed that is of materially greater diameter than the central opening 7 formed by the inwardly directed flange 5.

An inner ball race 8 adapted to be fitted to a shaft 9 comprises a cylindrical body portion, a cone portion 10 and a cylindrical head 11 of greater diameter than the body portion. Within the cup formed in the outer ball race 3 is an annular row of balls 12, the smaller cylindrical portion of the inner ball race 8 being surrounded by the balls 12, and extending through and beyond the central opening 7 defined by the inner edge of the inwardly directed flange 5. With the parts assembled as shown in Fig. 2, the balls 12 turn between the outer and inner ball races 3 and 8, respectively, and tangentially contact with the inwardly directed flange 5 of the outer ball race 3 and the cone 10 of the inner ball race 8.

That portion of smaller diameter of the inner ball race 8 which projects outward beyond the central opening 7 of the outer ball race flange 5 is provided with an annular groove 13, in which a split ring 14 lies partly embedded, this ring preferably being of circular cross-section. The split ring is of such thickness or cross sectional diameter that the external diameter of the ring is greater than the diameter of the opening 7 formed by the inner annular edge of the flange 5 of the outer race 3. Consequently, the smaller cylindrical portion of the inner ball race 8 cannot be unintentionally withdrawn through the central opening 7 in a direction to effect a separation of the elements of the ball bearing. This feature is also of particular value when the ball bearings are carried in stock prior to their installation in apparatus, since the bearings will not come apart inadvertently.

Another characteristic of value possessed by the ball bearing disclosed herein lies in the relation of the chamfer or bevel surface 6 to the split ring 14. As best shown in Fig. 2, the bevel surface 6 so overlies the split retaining ring 14 that the latter cannot open by mere radial expansion far enough to become clear of the inner ball race 8 before it encounters the bevel surface 6 of the flange 5. Moreover, any longitudinal movement of the shaft 9 which carries the split ring 14 against the flange 5 of the outer ball race 3 causes the split ring to tangentially engage the bevel surface 6, whereby the split ring is urged inward toward the bottom of its groove 13. Movement of the shaft 9 in the opposite longitudinal direction causes the cone 10 of the inner ball race to apply the end thrust to the balls 12. Thus, the flange 5 of the outer ball race 3 extends between the retaining ring 14 and the balls 12, so that end displacement of the shaft 9 in either direction is limited and cannot effect an unintentional separation of the elements of the ball bearing. This is a very convenient condition in assembling shafts, as they cannot fall out of place accidentally before the assembly is completed. Ordinarily, the shaft 9 would be provided with at least a pair of bearings like that already described, but turned in opposite directions so that the end thrusts of the shaft 9 would be applied by the cones 10 of the bearings to the balls 12 of one bearing or the other.

When it is desired or necessary to take the ball bearing apart, a free end of the split retaining ring 14 is forced out of its groove 13 with any convenient implement, but, in order to accomplish this, the displaced end of the ring 14 must be laterally deflected as well as lifted out of groove 13. Thus, a definite and peculiar manipulation must be given the retaining ring 14 to effect its removal to permit an intentional separation of the parts of the bearing.

Reference to Fig. 2 shows that the head 11 of the inner ball race 8 protrudes beyond the outer face of the flange 4 of the outer ball race 3. In view of this, any member mounted on the shaft 9 adjacent to the ball bearing, and shown in the drawing as being a gear 15, cannot approach the flange 4, since the cone 10 of the inner ball race 8 in assuming its closest possible relation to the balls 12 still maintains the outer face of the head 11 beyond the flange 4. Accordingly, there is no accidental friction between the stationary and movable parts of an assembly in which the bearing disclosed herein is used.

At its opposite ends, the bore of the inner ball race 8 is chamfered at 16 whereby it may be pushed onto the shaft 9 with greater facility at the time of assembly.

It is apparent that the anti-friction device disclosed herein is a simple and strong ball bearing, having relatively few parts, which are peculiarly formed to give an assurance of efficient and reliable assembly, which can only come apart by a prescribed method of manipulation. The retention of the parts in proper correlation has been shown to be accomplished by means that require no special tools, and there is an absence of construction in which any part may be injured or deformed in the process of taking the ball bearing apart. It is obvious, of course, that various modifications may be indulged in to suit different conditions without departing from the spirit of the invention as defined by the appended claims.

I claim:

1. A ball bearing comprising telescoped inner and outer ball race members, annularly arranged balls therebetween, one of said members being provided with an annular groove near one end thereof, and a removable split ring fitting into said groove, the other of said members having an annular flange extending between said balls and ring and being overlapped by said ring, said flange having a conical surface extending across the path of withdrawal of said ring in such close proximity to said ring as to prevent the complete removal of the ring from said groove by radial expansion alone of the ring, said conical surface forming an outwardly flaring space for the removal of said ring and a lateral guide for said ring upon its removal.

2. A ball bearing comprising telescoped inner and outer ball race members, annularly arranged balls therebetween contacting therewith, one of said ball race members having an annular flange the inner surface of which also contacts with said balls, said flange extending into proximity to the other ball race member and being provided with an outer annular bevelled surface, said other ball race member being provided with an annular groove normally adjacent to said bevelled surface, a removable spit ring fitting into said groove and having an external diameter that causes said ring to overlap said flange and prevent separation of said ball race members, the bevelled surface of said flange extending into such close proximity to said ring in the path of its removal as to prevent its removal by simple radial expansion, said bevelled surface and the groove-containing portion of said other ball race member forming a diametrically increasing and laterally progressing space for the removal of said ring.

3. A ball bearing comprising telescoped inner and outer ball race members, the outer member having a main circular portion and a radial annular flange, the inner ball race member having a cone and a tubular portion surrounded by said flange, said tubular portion being provided with an annular groove adjacent to the flange of said outer member, annularly arranged balls between and contacting with said circular and tubular portions and with said cone and flange, a split ring fitting into said groove on the side of said flange opposite to that engaged by said balls, said flange having a bevelled surface extending across said split ring in such close proximity thereto as to prevent its removal from said groove by radial expansion alone and being removable by simultaneous combined radial and lateral displacement.

4. A ball bearing comprising an outer cup-shaped ball race member provided with radial outwardly and inwardly extending annular flanges, said outwardly extending flange constituting an abutment for predeterminedly relating said cup-shaped ball race member to a mounting, an inner ball race member approximately axially co-extensive with said outer ball race member and provided near one end with a conical head entered into said outer member and with an annular groove near its opposite end, annularly arranged balls between said inner and outer ball race members and the inwardly directed flange and said head, a removable split ring in said groove on the side of the inwardly directed flange opposite to that engaged by said balls, said ring having an external diameter greater than the inner diameter of said inwardly directed flange, the latter having a bevelled surface extending closely across the split ring preventing its removal except by simultaneous radial expansion and lateral displacement.

5. A ball bearing comprising an outer cup-shaped ball race member provided with radial outwardly and inwardly extending annular flanges, said outwardly extending flange constituting an abutment for predeterminedly relating said cup-shaped ball race member to a mounting, an inner ball race member approximately axially co-extensive with said outer ball race member and provided near one end with a conical head entered into said outer member and with an annular groove near its opposite end, annularly arranged balls between said inner and outer ball race members and the inwardly directed flange and said head, said conical head having an abutment-forming extension projecting beyond the outwardly extending flange of said outer ball race member, a removable split ring in said groove on the side of the inwardly directed flange opposite to that engaged by said balls, said ring having an external diameter greater than the inner diameter of said inwardly directed flange, the latter having a bevelled surface extending closely across the split ring preventing its removal except by simultaneous radial expansion and lateral displacement.

6. An anti-friction bearing comprising an outer race member, an inner race member telescoped with said outer member and substantially axially co-extensive therewith, anti-friction elements between said race members, each of said race members having a plurality of angularly disposed bearing surfaces adapted to contact with the anti-friction elements in an anti-frictional relation whereby the bearing is adapted to take up radial thrust and end thrust in one direction, and a removable member affixed to one and co-operating with the other of said race members to take up end thrust in the other direction, said co-operated with race member being formed to prevent removal of said member except by simultaneous radial distortion and lateral displacement.

7. An anti-friction bearing comprising inner and outer race members, anti-friction elements therebetween, one of said race members having an annular groove near one of its ends, a split ring in said groove, the corresponding end of the other race member having a bevelled circular surface extending behind said ring below the outer diameter thereof and with increasing diameter toward said corresponding end of the last mentioned member, said bevelled surface extending across said ring in such proximity thereto as to prevent its removal from said groove by radial distortion alone, but permitting such removal along a path substantially parallel with said bevelled surface.

HANNIBAL C. FORD.